United States Patent
Pone

(10) Patent No.: US 8,869,892 B2
(45) Date of Patent: Oct. 28, 2014

(54) LOW SALINITY RESERVOIR ENVIRONMENT

(75) Inventor: Jean Denis Pone, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 427 days.

(21) Appl. No.: 13/016,678

(22) Filed: Jan. 28, 2011

(65) Prior Publication Data

US 2012/0067570 A1 Mar. 22, 2012

Related U.S. Application Data

(60) Provisional application No. 61/304,106, filed on Feb. 12, 2010.

(51) Int. Cl.
*E21B 43/22* (2006.01)
*E21B 43/20* (2006.01)
*C09K 8/58* (2006.01)

(52) U.S. Cl.
CPC .. *E21B 43/20* (2013.01); *C09K 8/58* (2013.01)
USPC .......................... 166/270.1; 166/400; 166/268

(58) Field of Classification Search
None
See application file for complete search history.

(56) References Cited

U.S. PATENT DOCUMENTS

| | | | |
|---|---|---|---|
| 4,194,564 A * | 3/1980 | Schievelbein | 166/270.1 |
| 4,204,574 A * | 5/1980 | Stalder | 166/305.1 |
| 4,228,853 A | 10/1980 | Harvey et al. | |
| 4,262,746 A * | 4/1981 | Hammett | 166/400 |
| 4,458,760 A | 7/1984 | Hurd | |
| 4,644,020 A | 2/1987 | Stahl | |
| 5,135,052 A | 8/1992 | Puerto | |
| 6,148,913 A | 11/2000 | Collins | |
| 6,886,632 B2 | 5/2005 | Raghuraman et al. | |
| 7,044,714 B2 | 5/2006 | Bevan et al. | |
| 7,137,447 B2 | 11/2006 | Shpakoff et al. | |
| 7,303,009 B2 | 12/2007 | Al-Muraikhi | |
| 7,373,977 B1 | 5/2008 | Berger et al. | |
| 7,581,594 B2 | 9/2009 | Tang | |
| 7,658,226 B2 | 2/2010 | Ziauddin et al. | |
| 2009/0194281 A1 | 8/2009 | Sheng | |

FOREIGN PATENT DOCUMENTS

WO 2007138327 12/2007

OTHER PUBLICATIONS

P.L. McGuire, SPE, J.R. Chatham, F.K. Paskvan, SPE, D.M. Sommer, SPE, F.H. Carini, SPE, BP Exploration (Alaska) Inc., "Low Salinity Oil Recovery: An exciting New EOR Opportunity for Alaska's North Slope", SPE 93903, 2005, 15 pages.
Jill Buckley, "Low Salinity Waterflooding", Jan. 15, 2009, 28 pages.
M.M. Sharma, Y.C. Yortsos, "Permeability Impairment Due to Migration in Sandstones", SPE 14819 , 1986, pp. 1-11.
S.F. Kia, H.S. Fogler, and M.G. Reed, "Effect of Salt Composition on Clay Release in Berea Sandstones", 1987, SPE 16254, pp. 91-100.
L.W. Lake, F. Helfferich, "Cation Exchange in Chemical Flooding: Part 2—The Effect of Dispersion, Cation Exchange, and Polymer/Surfactant Adsorption on Chemical Flood Environment", SPE 6769, 1978, pp. 1-10.

* cited by examiner

*Primary Examiner* — Angela M DiTrani

(74) *Attorney, Agent, or Firm* — ConocoPhillips Company

(57) ABSTRACT

Method for recovery of hydrocarbon includes: a. injecting mixture of high salinity brine and low salinity brine into the formation, wherein the mixture is injected into the formation through a first pump, wherein the first pump is an automated control pump, at a flow rate based on physical characteristics of the formation, the flow rate of the mixture gradually and continuously decreases, b. injecting fresh water into the formation, wherein the mixture is injected into the formation through a second pump, wherein the second pump is an automated control pump, wherein the fresh water is injected into the formation at a flow rate based on the physical characteristics of the formation, wherein the flow rate gradually and continuously increases; and c. introducing surfactants or polymers into the formation, wherein the surfactant acts as a motive force to drive the hydrocarbons towards one or more production wells.

13 Claims, 2 Drawing Sheets

LOW SALINITY RESERVOIR ENVIRONMENT

CROSS-REFERENCE TO RELATED APPLICATIONS

This application claims priority benefit under 35 U.S.C. Section 119(e) to U.S. Provisional Patent Ser. No. 61/304,106 filed on Feb. 12, 2010.

FIELD OF THE INVENTION

The present invention relates generally to methods and systems for hydrocarbon recovery. More particularly, but not by way of limitation, embodiments of the present invention include methods and systems for enhanced hydrocarbon recovery through secondary recovery operations.

BACKGROUND OF THE INVENTION

Petroleum (crude oil) is a finite resource that naturally occurs as a liquid in formations in the earth. Usually, crude oil is extracted by drilling wells into underground reservoirs. If the pressure of the crude oil underground is sufficient, then that pressure will cause the oil to rise to the surface. When pressure of the crude oil is sufficiently high, recovery simply involves constructing pipelines to carry the crude oil to storage facilities (e.g. tank batteries). This is known as primary recovery. If the pressure of the crude oil in the reservoir is insufficient to cause it to rise to the surface, then secondary means of recovery have to be used to recover the oil. Secondary oil recovery includes: pumping, water injection, natural gas reinjection, air injection, carbon dioxide injection or injection of some other gas into the reservoir.

The extraction of crude oil from a reservoir by conventional (primary/secondary oil) recovery technology, however, leaves behind a significant portion of the total amount of oil in that reservoir. Traditionally, the oil recovered from a reservoir, using conventional technology as compared to the total amount of oil in the reservoir, is about 33%. Thus, on average, when only conventional methods are used, approximately 67% of the oil in a reservoir is "stranded" in that reservoir. Consequently, an enhanced oil recovery (EOR) processes are used to increase crude oil recovery factors from reservoirs.

One method of enhanced oil recovery is by utilizing a waterflooding technique. Waterflooding in these reservoirs is characterized by early water breakthrough and rapidly increasing water-oil ratios to an uneconomic level. The injected water tends to travel only through the fractures and not interact with the rock matrix. That is, the water cannot penetrate into the matrix and thereby displace and recover oil trapped in the porous matrix. This injected water tends to recover only the oil left behind in the fracture system following primary production. This limited or no interaction of the water with the matrix is caused in large part by the matrix portion not being water-wet. That is, the matrix will not spontaneously imbibe water.

One approach to increase the penetration of a water phase with the matrix blocks containing trapped oil is to add a surfactant to the water. A surfactant is a wetting agent that lowers the interfacial tension between fluids or substances. Applied in oil recovery, surfactants reduce the interfacial tension that may prevent oil droplets from moving easily through a reservoir. The use of surfactants in aiding oil to move easily through the reservoir involves the creation of microemulsions. Microemulsions are generally clear, stable, mixtures of oil, water and surfactant, sometimes in combination with a co-surfactant. By themselves, oil and water are immiscible but when oil and water are mixed with the appropriate surfactant, the oil water and surfactant are brought into a single microemulsion phase. The microemulsion's salinity affects the microemulsion's effectiveness in enhancing the recovery of oil from a reservoir. Salinity is a measure of salt content.

Many EOR techniques have been disclosed in the past yet the EOR process is not widely used by the industry for several reasons. For example, in the EOR processes employing chemicals, petroleum sulfonates and synthetic alkylaryl sulfonates are predominantly used as the surfactant to lower the interfacial tension (IFT) between the residual oil and the injection fluid in order to overcome the capillary forces trapping the oil. Partially hydrolyzed polyacrylamides are generally employed as the viscosifier for mobility control. Both the polymers and surfactants used are not salt and multivalent cation tolerant and therefore either a fresh water source or pre-treatment of the injection water is required. Also, a costly hydration unit is often required for the polymer in order to properly dissolve and develop its viscosity. Furthermore, often a high concentration of the surfactant is required for proper oil displacement, or, alkali is used with the surfactant to enhance the interfacial tension and reduce the surfactant adsorption. In addition, the polyacrylamide may precipitate and cause serious formation damage when contacting the connate water containing multivalent cations. Most polymers are not stable at temperatures above 140° C. and are irreversibly degraded by shear. The huge up-front investment and product limitations currently discourage the wide use of the EOR process.

The importance of surfactant and polymer adsorption to the practicality and economics of the chemical flooding process has long been recognized because adsorption directly affects the quantity and rate at which surfactant and polymer can be propagated through the reservoir. However, surfactant and polymer floods require precise salinity environment to be effective. Furthermore, lower interfacial tensions induced by surfactant and polymer injection, however, cannot be attained at high sodium chloride concentrations. Additionally, surfactant precipitation and polymer rheological behavior is controlled by the salinity of the brine, which limits the range of salinity under which such processes must be operated.

Additionally, previous attempt to lower the salinity of the formation by preflushing before EOR processes application has lead to formation damage.

Therefore, a need exists for a reservoir with appropriate low-salinity characteristics for surfactants and polymer optimum efficiency for enhanced oil recovery.

SUMMARY OF THE INVENTION

In an embodiment of the present invention, a method to enhance oil recovery from a hydrocarbon-containing formation, the method includes: (a) injecting a mixture of high salinity brine and low salinity brine into the formation, wherein the mixture is injected into the formation through a first pump, wherein the first pump is a automated control pump, wherein the mixture is injected at a flow rate based on the physical characteristics of the formation, wherein the flow rate of the mixture gradually and continuously decreases, wherein the flow rate of the mixture gradually and continuously decreases the concentration within the formation; (b) simultaneously with step(a), injecting fresh water into the formation, wherein the mixture is injected into the formation through a second pump, wherein the second pump is an automated control pump, wherein the fresh water is injected into the formation at a flow rate based on the physical characteristics of the formation, wherein the flow rate gradually and continuously increases; and (c) introducing surfactants and/or polymers into the formation, wherein the surfactant acts as a motive force to drive the hydrocarbons towards one or more production wells.

In another embodiment of the present invention, a method to enhance oil recovery from a hydrocarbon-containing formation, the method includes: (a) injecting a mixture of high salinity brine and low salinity brine into the formation; (b) simultaneously with step(a), injecting fresh water into the formation; and (c) introducing surfactant and/or polymers into the formation, wherein the surfactant acts as a motive force to drive the hydrocarbons towards one or more production wells.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
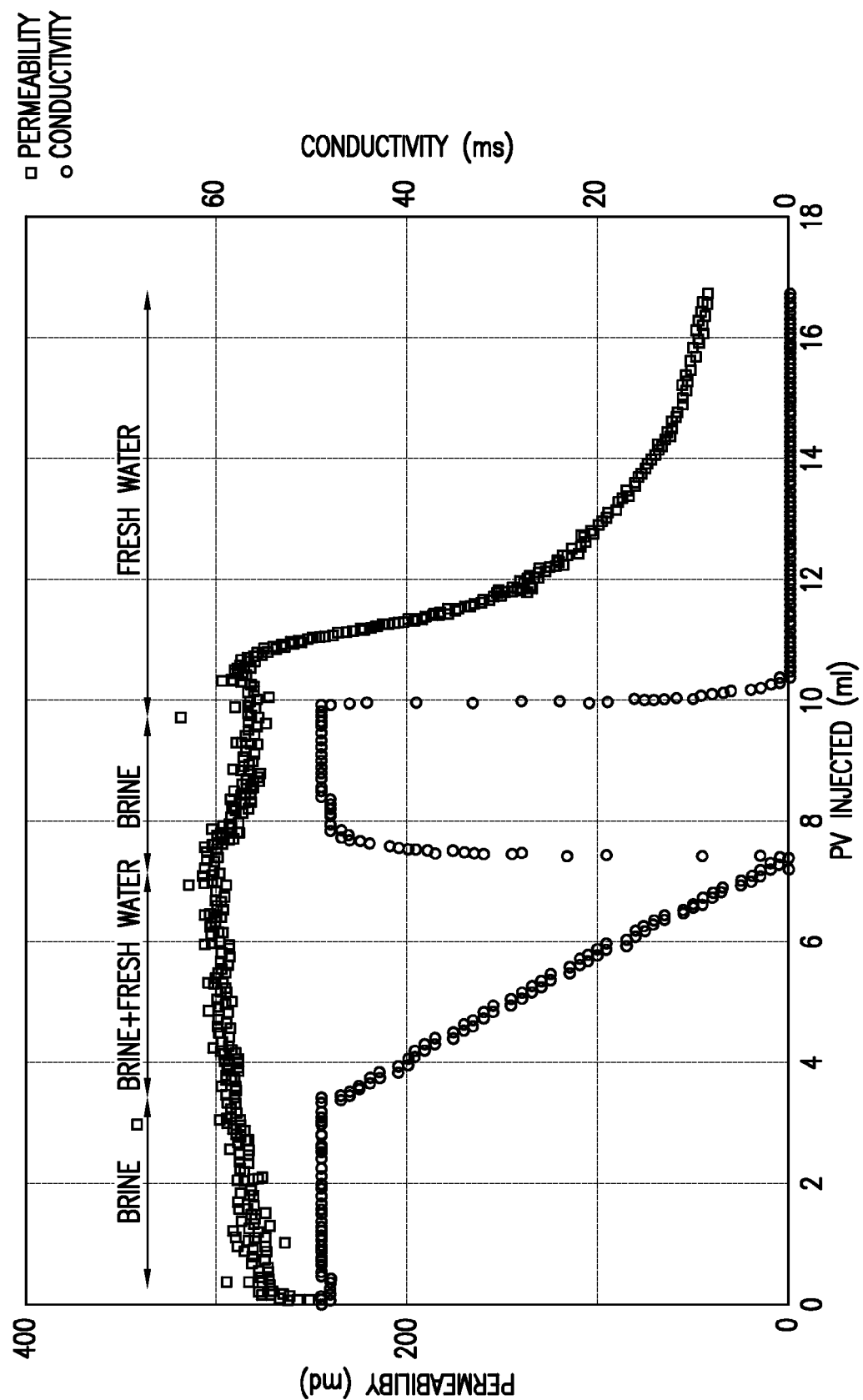
FIG. 1 shows permeability and conductivity profiles during high salinity and fresh water salinity displacement during laboratory experimentation utilizing sandstone sample A.

Reference will now be made in detail to embodiments of the present invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the appended claims and their equivalents.

A fundamental requirement for a successful chemical flood is to provide an adequate ionic environment for surfactant and polymer, to ensure that the desired interfacial activity, phase behavior, and mobility control are maintained. Establishing an appropriate reservoir salinity level to reduce the surfactant and polymer adsorption consequently reduce the optimal costs and results in additional retrieval of downhole hydrocarbons.

Surfactant and polymer displacement efficiency depends essentially on lowering the interfacial tension and maintaining reservoir permeability and injectability. An understanding of the relationship between low tensions and phase behavior shows the displacement mechanisms necessity of controlling, if not maintaining, the conditions of optimum flow and phase behavior. Thus, the use of water salinity gradient for gradual and continuous dilution of high salinity brine in the system is better suited for surfactant and polymer flooding conditions than the preflush technique or any method used to prevent precipitation, salting out, adsorption or phase inversion.

In an embodiment, a mixture of low salinity brine and high salinity brine are pumped into the hydrocarbon-containing formation to gradually and continuously reduce the salinity within the formation. In an embodiment, the pump is an automated control pump. The mixture is injected into the formation at a flow rate dependent on the physical characteristics of the formation. In an embodiment, the mixture is injected into the formation at a ramp rate of Q to 0.

Simultaneously with injecting the high and low salinity mixture into the formation, a second pump injects fresh water into the formation. In an embodiment, the pump is an automated control pump. The fresh water is injected into the formation at a rate dependent on the physical characteristics of the formation. In an embodiment, the fresh water is injected into the formation at a ramp rate from 0 to Q.

In an embodiment, the first pump and the second pump are pumping inside an inline mixer. The total flow rate exiting the mixer is Q. The salinity is thus gradually and continuously reduced.

In an embodiment, a mixture of low salinity brine and high salinity brine are pumped into the hydrocarbon-containing formation to gradually and continuously reduce the salinity within the formation to prevent formation damage.

In an embodiment, a mixture of low salinity brine and high salinity brine are pumped into the hydrocarbon-containing formation to gradually and continuously reduce the salinity within the formation to established a favorable environment for chemical flooding

EXAMPLE

From simulation results, it was discovered that an optimum salinity profile embodying principles of the present invention provided a higher oil recovery.

A sandstone core sample, 1.5 inch in diameter and 3 inches in length, which was vacuum saturated with high salinity brine (35,000 ppm) was placed in a coreholder. Next, a 500 psi overburden pressure is applied to the core sample.

The coreholder, containing the core sample, is then connected to an automatic controlled pump, which delivers a mixture of high salinity brine and low salinity brine at a chosen flow rate Q calculated based on the physical characteristics of the sample. Pressures upstream and downstream of the sample were recorded using high pressure transducers for permeability determination. The permeability was computed using Darcy's law for one dimensional flow of a homogeneous fluid through porous media.

After the pressure drop across the core stabilized and the high salinity brine permeability was established, a second pump was connected to deliver fresh water. The first pump and the second pump were connected to an inline mixer. The two pumps were set in a way so that the high salinity brine delivery rate ramped down from Q to 0, while the fresh water delivery rate ramped up from 0 to Q. The total flow rate exiting the mixer was constant at Q during the entire experiment. This step gradually and continuously decreased the water salinity from 35,000 ppm to 0 ppm. The upstream and downstream pressure helped quantify the damage, if any.

Figure 2:
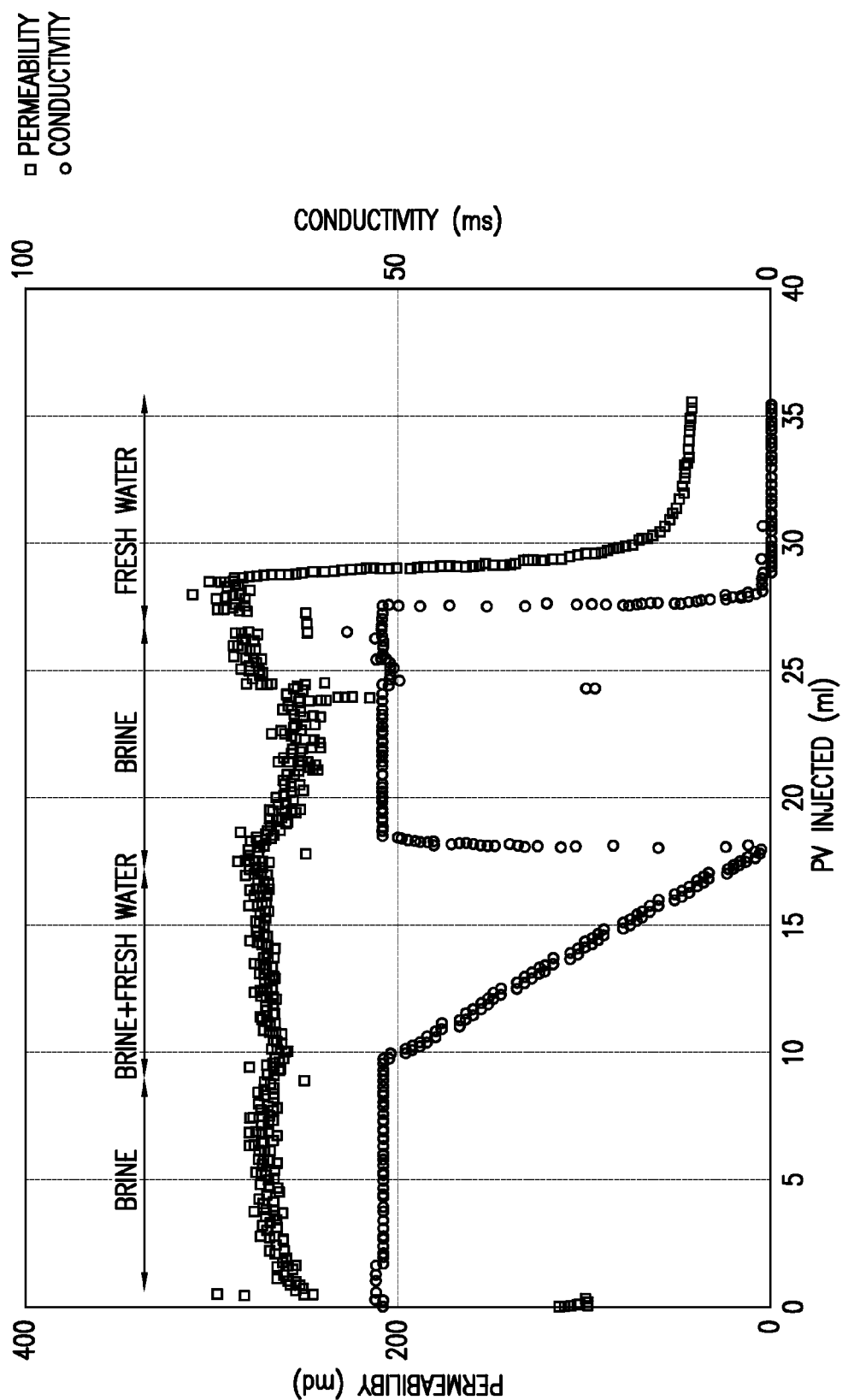
FIG. 2 shows permeability and conductivity profiles during high salinity and fresh water salinity displacement during laboratory experimentation utilizing sandstone sample B.

FIGS. 1 and 2 provide examples of permeability and conductivity profiles during high salinity and fresh water displacement under experimental conditions utilizing two different core samples.

The process was then switched back to the high salinity brine to verify that the permeability of the sample had not been compromised. After the pressure drop across the core stabilized and the high salinity brine permeability was reestablished, the flow rate was abruptly (i.e., shocked) changed from the salt water solution to fresh water. This step confirmed that the sample used was sensitive to water chemistry and the injection scheme. The presence of clay particles in the effluent stream from the shocked cores was detected by the turbinity measurements.

The preferred embodiment of the present invention has been disclosed and illustrated. However, the invention is intended to be as broad as defined in the claims below. Those skilled in the art may be able to study the preferred embodiments and identify other ways to practice the invention that are not exactly as described in the present invention. It is the intent of the inventors that variations and equivalents of the invention are within the scope of the claims below and the description, abstract and drawings not to be used to limit the scope of the invention.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:

1. Kia, S. F.; Fogler, H. S; Reed, M. G., "Effect of salt composition on clay release in Berea Sandstones", Soc. of Petrol. Engrs., 1987, SPE Int'l. Symposium on Oilfield Chemistry, San Antonia, Tex.
2. Sharma, M. M., Yortsos, Y. C., "Permeability impairment due to fines migration in Sandstones", Soc. of Petrol. Engrs., 1986, SPE Formation Damage Control Symposium, Lafayette, La.
3. Lake, L. W.; Helfferich, F., "Cation exchange in chemical flooding: Part 2—The effect of dispersion, cation exchange, and polymer/surfactant adsorption on chemical flooding environment", Soc. of Petrol. Engrs., 1978, pp. 16, (6), 435-444.
4. Hiraski, G., "Ion exchange with clays in the presence of surfactant", Soc. of Petrol. Engrs., 1982, pp. 22, (2), 181-192, SPE Formation Evaluation.
5. Campbell, T. C., "Chemical flooding: A comparison between alkaline and soft saline preflush system for removal of hardness ions from reservoir brines", Soc. of Petrol. Engrs., 1978, SPE Oilfield in Geothermal Chemistry Symposium, Houston, Tex.
6. Delshad, M.; Han, W.; Pope, G. A.; Sepehrnoori, K.; Wu, W.; Yang, R.; Zhao, L., "Alkaline/Surfactant/Polymer Flood Prediction for the Karamay Oil Field", Soc. of Petrol. Engrs., 1998, SPE/DOW Improved Oil Recovery Symposium, Tulsa, Okla.
7. Griffith, T. D., "Application of the ion exchange process to reservoir preflushes", SPE Annual Fall Technical Conference and Exhibition, American Institute of Minin, Metallurgical, and Petroleum Engineer, Inc., Houston, Tex., 1978.
8. Healy, R. N.; Reed, R. L., "Immiscible Microemulsion Flooding", 1977, pp. 17, (2), 129-139.
9. Hill, H. J., "Cation Exchange in Chemical Flooding: Part 3—Experimental", 1978, 18, (6), 445-456.
10. Hill, H. J.; Helfferich, F. G.; Lake, L. W.; Reisberg, J.; Pope, G. A., "Cation Exchange and Chemical Flooding", SPE Journal of Petroleum Technology, 1977, pp. 29, (10), 1336-1338.
11. Hirasaki, G., "Ion Exchange with Clay in the Presence of Surfactant", 1982, pp. 22, (2), 181-192.
12. Lake, L. W.; Helfferich, F., "Cation Exchange Chemical Flooding: Part 2—The Effect of Dispersion, Cation Exchange, and Polymer/Surfactant Adsorption on Chemical Flooding Environment", 1978, pp. 18, (6), 435-444.
13. Okasha, T. M.; Alshiwaish, A., "Effect of brine salinity on interfacial tension in Arab-D Carbonate Reservoir, Saudi Arabia", Soc. of Petrol. Engrs., 2009, SPE Middle East Oil and Gas Show and Conference, Bahrain, Bahrain.
14. Pope, G. A.; Lake, L. W.; Helfferich, F. G., "Cation Exchange in Chemical Flooding: Part 1—Basic Theory Without Dispersion", 1978, pp. 18, (6), 418-434.
15. Sharma, M. M.; Yortsos, Y. C., "Permeability impairment due to fines migration in Sandstones", Soc. of Petrol. Engrs., 1986, SPE Formation Damage Control Symposium, Lafayette, La.
16. Tang, G. Q.; Morrow, N. R., "Influence of brine composition and fines migration on crude oil/brine/rock interactions and oil recovery", Journal of Petroleum Science and Engineering, 1999, pp. 24, (2-4), 99-111.
17. Valdya, R. N.; Folger, H. S., "Fines migration and formation damage: Influence of pH and ion exchange", SPE Production Engineering, 1992, pp. 7, (4), 325-330.

The invention claimed is:

1. A method to enhance oil recovery from a hydrocarbon-containing formation, the method comprising:
   a. injecting a mixture of higher salinity brine and lower salinity brine into the formation, wherein the mixture is injected into the formation through a first pump, wherein the first pump is an automated control pump, wherein the mixture is injected at a flow rate based on the physical characteristics of the formation, wherein the flow rate of the mixture gradually and continuously decreases;
   b. simultaneously with step (a), injecting fresh water into the formation, wherein the fresh water is injected into the formation through a second pump, wherein the second pump is an automated control pump, wherein the fresh water is injected into the formation at a flow rate based on physical characteristics of the formation, wherein the flow rate gradually and continuously increases; and
   c. introducing surfactants and/or polymers into the formation, wherein the surfactant and/or polymers acts as a motive force to drive the hydrocarbons towards one or more production wells.

2. The method according to claim 1, wherein pressure of the formation is monitored prior to step (a).

3. The method according to claim 2, wherein a transducer monitors the pressure of the formation.

4. The method according to claim 1, wherein pressure of the formation is monitored during steps (a)-(c).

5. The method according to claim 4, wherein a transducer monitors the pressure of the formation.

6. The method according to claim 1, wherein pressure of the formation is monitored subsequent to step (c).

7. The method according to claim 6, wherein a transducer monitors the pressure of the formation.

8. A method to enhance oil recovery from a hydrocarbon-containing formation, the method comprising:
   a. monitoring pressure of the formation;
   b. injecting a mixture of higher salinity brine and lower salinity brine into the formation, wherein the mixture is injected into the formation through a first pump, wherein the first pump is an automated control pump, wherein the mixture is injected at a flow rate based on the physical characteristics of the formation, wherein the flow rate of the mixture gradually and continuously decreases;
   c. simultaneously with step (b), injecting fresh water into the formation, wherein the fresh water is injected into the formation through a second pump, wherein the second pump is an automated control pump, wherein the fresh water is injected into the formation at a flow rate based on physical characteristics of the formation, wherein the flow rate gradually and continuously increases, wherein the mixture is injected; and d. introducing surfactant and/or polymers into the formation, wherein the surfactant and/or polymers acts as a motive force to drive the hydrocarbons towards one or more production wells.

9. The method according to claim 8, wherein a transducer monitors the pressure of the formation.

10. The method according to claim 8, wherein pressure of the formation is monitored after step (b).

11. The method according to claim 10 wherein a transducer monitors the pressure of the formation.

12. The method according to claim 8, wherein pressure of the formation is monitored subsequent to step (d).

13. The method according to claim 12, wherein a pressure transducer monitors the pressure of the formation.

\* \* \* \* \*